United States Patent [19]

Chapple

[11] Patent Number: 5,258,133
[45] Date of Patent: Nov. 2, 1993

[54] SODIUM PERCARBONATE STABILIZED WITH A COATING OF AN ALKALIMETAL CITRATE

[75] Inventor: Andrew P. Chapple, Wrexham, Great Britain

[73] Assignee: Lever Brothers Company, Division of Conopco, Inc., New York, N.Y.

[21] Appl. No.: 986,419

[22] Filed: Dec. 7, 1992

[30] Foreign Application Priority Data

Dec. 11, 1991 [GB] United Kingdom ............. 9126296

[51] Int. Cl.$^5$ ............. C09K 15/06; C11D 3/20; C11D 3/395; C11D 17/06
[52] U.S. Cl. ............. 252/95; 252/90; 252/174; 252/174.13; 252/174.14; 252/174.19; 252/174.24; 252/174.25; 252/186.27; 252/186.31; 252/186.32; 423/268; 423/415.2
[58] Field of Search .............. 252/95, 174, 174.13, 252/174.14, 174.24, 174.25, 186.27, 186.31, 186.32, 174.19, 90; 423/268, 415 P

[56] References Cited

U.S. PATENT DOCUMENTS

| | | | |
|---|---|---|---|
| 3,640,885 | 2/1972 | Rhees | 252/186.32 |
| 3,883,640 | 5/1975 | Smart | 423/415 P |
| 3,933,672 | 1/1976 | Bartolotta | 252/116 |
| 3,950,275 | 4/1976 | Toyoda | 252/527 |
| 3,977,988 | 8/1976 | Tokiwa | 423/415 P |
| 3,979,318 | 9/1976 | Tokiwa | 252/95 |
| 4,025,609 | 5/1977 | Matsunaga | 423/415 P |
| 4,075,116 | 2/1978 | Mesaros | 252/102 |
| 4,078,099 | 3/1978 | Mazzola | 252/95 |
| 4,117,087 | 9/1978 | Dillenburg | 423/415 P |
| 4,135,010 | 1/9179 | Klebe | 252/99 |
| 4,208,295 | 6/1980 | Sai | 252/95 |
| 4,260,508 | 4/1981 | Maddox | 252/99 |
| 4,321,301 | 3/1982 | Brichard | 252/99 |
| 4,381,247 | 4/1983 | Nakagawa | 252/95 |
| 4,421,669 | 12/1983 | Brichard | 252/95 |
| 4,526,698 | 7/1985 | Kuroda | 252/99 |
| 4,849,198 | 7/1989 | Ruhs | 423/415 P |
| 5,194,176 | 3/1993 | Copenhafer | 252/186.27 |
| 5,200,236 | 4/1993 | Lang | 252/99 |

FOREIGN PATENT DOCUMENTS

| | | |
|---|---|---|
| 0414463 | 2/1991 | European Pat. Off. . |
| 0459625 | 12/1991 | European Pat. Off. . |
| 2477174 | 9/1981 | France . |
| 50-92896 | 7/1975 | Japan ............. 423/415 P |
| 1361708 | 7/1974 | United Kingdom . |
| 1538893 | 1/1979 | United Kingdom . |
| 1579513 | 11/1980 | United Kingdom . |
| 2123044 | 1/1984 | United Kingdom . |

OTHER PUBLICATIONS

Patent Abstracts of Japan, vol. 007, No. 167 (C-177) Jul. 22, 1983 and JP-A-58 074 508 (Mitsubishi Gas Kagaku KK) May 6, 1983.

*Primary Examiner*—Dennis Albrecht
*Attorney, Agent, or Firm*—Milton L. Honig

[57] ABSTRACT

A stable coated percarbonate bleach product is described wherein sodium percarbonate particles are coated with at least 1% by weight of an alkalimetal citrate wherein the product is formed by spraying a solution of the alkalimetal citrate onto the sodium percarbonate particles.

6 Claims, No Drawings

SODIUM PERCARBONATE STABILIZED WITH A COATING OF AN ALKALIMETAL CITRATE

This invention to sodium percarbonate having improved stability and to the use thereof in detergent compositions.

Sodium percarbonate ($Na_2CO_3.1\frac{1}{2} H_2O_2$) is a hydrogen peroxide adduct and has been used as a bleaching agent and oxidising agent. However, sodium perborate mono- and tetrahydrate is currently still the most widely used peroxygen bleaching agent in and with detergent compositions, especially laundry detergent compositions. The reason for this is that, unlike sodium perborate, sodium percarbonate is relatively unstable when used in alkaline detergent compositions especially when such compositions are stored at higher temperature and/or higher humidity than normal. Sodium percarbonate is furthermore quite unstable when incorporated zeolite in containing detergent powder formulations.

In the move to formulate "greener" products, the use of sodium percarbonate to replace sodium perborate as a bleaching agent in or with detergent compositions is becoming increasingly more interesting, and especially in zero-P and zeolite containing detergent compositions. Numerous attempts have been made to improve the stability of sodium percarbonate by both detergent and sodium percarbonate manufacturers, but so far without much success and/or results which themselves have disadvantages.

Thus, for example, GB-A-1,361,708 (F M C Corp) suggests agglomeration with sodium silicate; GB-A-1,538,893 (Interox) suggests coating with sodium carbonate, sulphate and silicate; GB-A-1,579,513 (Degussa) suggests coating with sodium silicate and sodium percarbonate and/or sodium triphosphate; and GB-A-2,123,044 (Kao) suggests coating with a coating agent comprising sodium borate, particularly sodium metaborate.

Apparently, the selection of specific coating material as well as amounts is essential to obtain an improvement in percarbonate stability. A major disadvantage of the above art methods is that the coating agents comprise materials which in modern detergent powder compositions are not particularly desirable and are preferably omitted. Thus, alkaline sodium silicate can cause peracid instability in zeolite built detergent composition. Sodium triphosphate is a phosphorus containing material which is believed to cause eutrophication of surface waters and not allowed for use in many countries by law. Sodium metaborate is a boron- containing material not particularly desirable for environmental reasons. Sodium sulpate, by itself does not offer many advantages as it used as a filler.

It has now been found that the stability of sodium percarbonate can be improved to a satisfactory degree by coating or agglomerating the percarbonate with a useful and environmentally friendly material.

Accordingly, the invention provides sodium percarbonate coated or agglomerated with a coating agent essentially comprising an alkali-metal citrate, preferably sodium citrate. Said coated or agglomerated sodium percarbonate when used in detergent compositions, shows improved stability in moist and warm surroundings; has a comparatively low active oxygen loss even in moist and warm surroundings; and basically maintains its good solution rate.

The coated or agglomerated sodium percarbonate according to the invention has a further advantage in that the coating material i.e. sodium citrate by itself is a good detergency builder. It is also known that sodium citrate can function as an excellent co-builder for use in zeolite-built detergent compositions thereby improving the detergency and bleach performance of such compositions, as described in EP-A-0,313,144 and EP-A-0,448,298.

The invention therefore provides a stable coated sodium percarbonate which is not only environmentally acceptable but also has the desired property of dual functionality as a bleaching agent with a builder action.

Coating of the sodium percarbonate according to the invention can be effected by any of the conventional coating techniques known in the art such as, for example, by spraying percarbonate particles in a pan-granulator or a rotating drum, followed by drying. A preferred and convenient method however uses a fluid bed drier, wherein coating and drying are effected in one step.

The amount of sodium citrate required as coating can be varied at will. Improved stability can be observed at a level of about 1%, based on the weight of sodium percarbonate, to as high as technically possible. Since sodium citrate is water-soluble and a useful builder component in detergent compositions there is no specific limitation for the upper level, though 50% by weight based on sodium percarbonate may be taken the as practical upper level.

For the sole purpose of improving stability of sodium percarbonate an amount of sodium citrate up to 30% by weight, preferably from 5% to 15% by weight, based on sodium percarbonate will be sufficient.

The citrate coated sodium percarbonate of the invention is sufficiently stable to be used with or in any detergent composition, including zeolite-containing detergent compositions.

Preferably the coated sodium percarbonate will have a particle size within the range 100 to 1000 μm.

Furthermore, detergent bleach compositions containing the coated sodium percarbonate of the invention show a significantly improved stability on storage, not only with respect to the sodium percarbonate itself but also with respect to other bleach sensitive ingredients, such as fluorescent agents, enzymes and colorants.

The invention, therefore, also provides a detergent bleach composition comprising citrate coated sodium percarbonate, present in an amount from 1 to 40% by weight of the detergent composition.

The detergent bleach composition of the invention may further contain the usual ingredients, such as surface-active materials, including soaps, synthetic anionic, nonionic, cationic and zwitterionic detergent surfactants, present in an amount from 0.5 to 50% by weight; detergency builders including aluminosilicates, such as the zeolites, e.g. zeolite A, B, C, X and Y types as well as the zeolite P as described in EP-A-0,384,070, present in an amount from 5 to 80% by weight. Other usual ingredients are enzymes, such as proteases, amylases, lipases, cellulases and oxidases; fluorescent agents; the various known multifunctional polymers; stabilizing agents such as ethylene diamine tetra acetate (EDTA) and the polyphosponic acid derivatives (e.g. Dequest ®), etc.

Other optional but preferred ingredients which can be used herein together with the coated sodium percarbonate are bleach activators or peroxyacid bleach precursors, well-known in the art, for example N, N, $N^1$, N$^1$- tetraacetylethylene diamine (TAED), sodium nonanoyloxybenzene sulphonate (SNOBS), choline sulphophenyl carbonate (CSPC), and glucose penta-acetate (GPA). Also useful and usable in the detergent compositions of the invention are the so-called "bleach catalysts", either of the organic type e.g. sulphonimines as described in EP-A-0,453,982 and EP-A-0,446,982, or the transition metal complex catalyst e.g. [Mn$_2^{IV}$(Me$_3$-TACN)$_2$] as described in co-pending European Patent Specifications Nos 458 397 and 458 398.

Detergent compositions comprising the coated sodium percarbonate can be used to bleach stained substrates by contacting the substrate in aqueous medium with the detergent composition.

The invention will now be illustrated by way of the following non-limiting examples.

EXAMPLES

Example I

Sodium percarbonate ("Oxyper" ex Interox) was coated, in a fluid bed drier, with a solution of trisodium citrate to give coatings of 5 and 10% (w/w).

Equivalent sieve fractions (500-710 μm) of these coated percarbonates were stored in a spray-dried zeolite containing base powder (formulation given below) in sealed bottles at 28° and 37° C. (All samples contained 1.25 g percarbonate and 8.75 g base powder).

An uncoated percarbonate sample (again sieved to 500-710 μm) was stored under the same conditions and used as a control.

Percarbonate decomposition was monitored by measuring available oxygen (permanganate titration) at regular intervals.

| 28° C. | % Percarbonate Remaining | | |
|---|---|---|---|
| Time (days) | Uncoated | 5% Citrate | 10% Citrate |
| 0 | 100 | 100 | 100 |
| 7 | 89.1 | 97.0 | 97.7 |
| 14 | 87.1 | 93.4 | 95.4 |
| 28 | 61.4 | 91.5 | 91.5 |
| 42 | 57.1 | 77.4 | 89.2 |
| 56 | 46.8 | 80.6 | 86.0 |
| 70 | 46.1 | 74.6 | 84.7 |

| 37° C. | % Percarbonate Remaining | | |
|---|---|---|---|
| Time (days) | Uncoated | 5% Citrate | 10% Citrate |
| 0 | 100 | 100 | 100 |
| 7 | 95.9 | 100 | 95.9 |
| 14 | 83.6 | 88.8 | 95.2 |
| 28 | 62.6 | 83.1 | 87.2 |
| 42 | 55.7 | 72.1 | 84.9 |
| 56 | 42.1 | 73.2 | 84.6 |

These results clearly show the benefit of the citrate coating.

| Base Powder Composition | |
|---|---|
| Component | % by Weight |
| LAS | 16.8 |
| Synperonic A3 | 5.6 |
| Synperonic A7 | 1.9 |
| Sokalan CP5 | 7.5 |
| Zeolite 4A (Degussa) | 44.8 |
| Na Silicate (3.3 ratio) | 1.3 |
| Na Carbonate | 3.7 |
| Minor Ingredients | 1.6 |
| Water (nominal) | 16.8 |

The bulk density of this powder was 500 g liter.

EXAMPLE II

The 5% citrate coated percarbonate sample described in example I was also stored mixed with a spray-dried/densified zeolite containing detergent base powder. (formulation given below). Again an uncoated percarbonate sample was stored under the same conditions and used as a control.

The base powder was fluid-bed dried (80° C. inlet temperature, for 10 min.) prior to mixing with the percarbonate. The ratio of percarbonate to base powder was as in example I. Storage of the mixtures was at 28° and 37° C. in sealed bottles.

| 28° C. | % Percarbonate Remaining | |
|---|---|---|
| Time (days) | Uncoated | 5% Citrate |
| 0 | 100 | 100 |
| 7 | 98.4 | 100 |
| 14 | 99.1 | 100 |
| 28 | 91.1 | 97.2 |
| 42 | 93.2 | 90.5 |
| 56 | 89.0 | 89.1 |
| 70 | 82.0 | 93.7 |

| 37° | % Percarbonate Remaining | |
|---|---|---|
| Time (days) | Uncoated | 5% Citrate |
| 0 | 100 | 100 |
| 7 | 98.4 | 96.7 |
| 14 | 83.6 | 89.1 |
| 28 | 72.8 | 77.7 |
| 42 | 30.1 | 58.6 |
| 56 | 21.0 | 49.8 |
| 70 | 23.7 | 46.3 |

| Base Powder Composition | |
|---|---|
| Component | % by Weight |
| LAS | 11.4 |
| Synperonic A3 | 5.8 |
| Synperonic A7 | 3.4 |
| Sokalan CP5 | 6.2 |
| Zeolite 4A (Degussa) | 38.6 |
| Na Carbonate | 11.7 |
| Soap | 2.5 |
| Moisture and Minors | 20.4 |

The bulk density of this powder was 850 g/liter.

EXAMPLE III

A sample "Oxyper" percarbonate was coated with a solution of trisodium citrate by spraying in a rotating drum mixer. Excess moisture was then removed in a fluid-bed drier. The material produced contained 5% by weight sodium citrate.

This coated material was stored mixed with an equivalent base powder to that used in example II. Storage was at 37° C. in sealed bottles in the same manner as in example II.

| 37° C. | % Percarbonate Remaining | |
|---|---|---|
| Time (days) | Uncoated | 5% Citrate |
| 0 | 100 | 100 |
| 7 | 85.9 | 97.3 |
| 14 | 73.9 | 89.8 |
| 28 | 67.8 | 76.7 |
| 42 | 50.5 | 56.1 |
| 56 | 32.9 | 60.4 |
| 70 | 15.5 | 51.8 |

This demonstrates an alternative method of preparing the coated percarbonate still gives beneficial results.

EXAMPLE IV

The percarbonate coated with 5% sodium citrate described in example I (again a 500–710 μm sieve fraction) was stored in admixture with a zeolite base powder produced by a non-tower granulation method, (formulation given below). The ratio of percarbonate to base powder in this case was 1.43 g: 3.57 g. Storage was at 28° C. in sealed bottles.

| 28° C. | % Percarbonate Remaining | |
|---|---|---|
| Time (days) | Uncoated | 5% Citrate |
| 0 | 100 | 100 |
| 7 | 95.0 | 94.4 |
| 14 | 94.4 | 95.8 |
| 28 | 84.7 | 90.0 |
| 42 | 79.5 | 90.8 |

| Base Powder Composition | |
|---|---|
| Component | % by Weight |
| PAS (coco) | 10.4 |
| Synperonic A3 | 14.5 |
| Synperonic A7 | 9.8 |
| *Zeolite P | 51.0 |
| Fluorescer | 0.4 |
| SCMC | 1.0 |
| Water (nominal) | 12.8 |

*Zeolite P as described in EP-A-O 384 070.

The bulk density of this powder was 820 g/liter.

I claim:

1. A stable bleach product comprising sodium percarbonate particles having coated on the percarbonate particles an alkalimetal citrate in an amount of at least 1% by weight based on the sodium percarbonate, wherein said bleach product is made by spraying a solution of the alkalimetal citrate onto the particulate sodium percarbonate.

2. A bleach product according to claim 1 wherein the alkalimetal citrate is sodium citrate.

3. A bleach product according to claim 1 having a particle size within the range 100 to 1,000 μm.

4. A bleach product according to claim 1 wherein spraying is performed in an apparatus selected from the group consisting of a pan-granulator, a rotating drum and a fluid-bed drier.

5. A detergent composition comprising:
   (i) from 1 to 40% by weight of a bleach product comprising sodium percarbonate particles having coated on the percarbonate particles an alkalimetal citrate in an amount of at least 1% by weight based on the sodium percarbonate wherein said bleach product is made by spraying a solution of the alkalimetal citrate onto the particulate sodium percarbonate; and
   (ii) from 0.5 to 50% by weight of a surface-active agent.

6. A detergent composition comprising:
   (i) from 1 to 40% by weight of a bleach product comprising sodium percarbonate particles having coated on the percarbonate particles an alkalimetal citrate in an amount of at least 1% by weight based on the sodium percarbonate, wherein said bleach product is made by spraying a solution of the alkalimetal citrate onto the particulate sodium percarbonate; and
   (ii) from 5 to 80% by weight of a detergency builder.

* * * * *